Dec. 11, 1934.    J. F. WICK    1,984,167
BALANCED VALVE FOR PIPE ORGANS
Filed Nov. 8, 1933    2 Sheets-Sheet 1
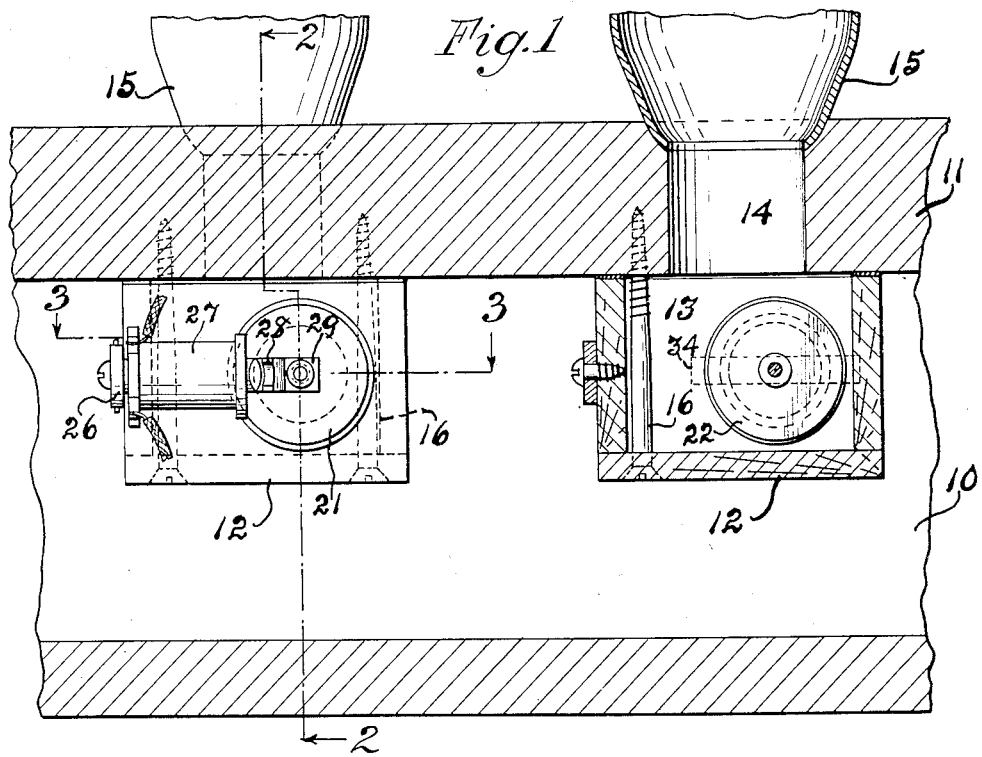
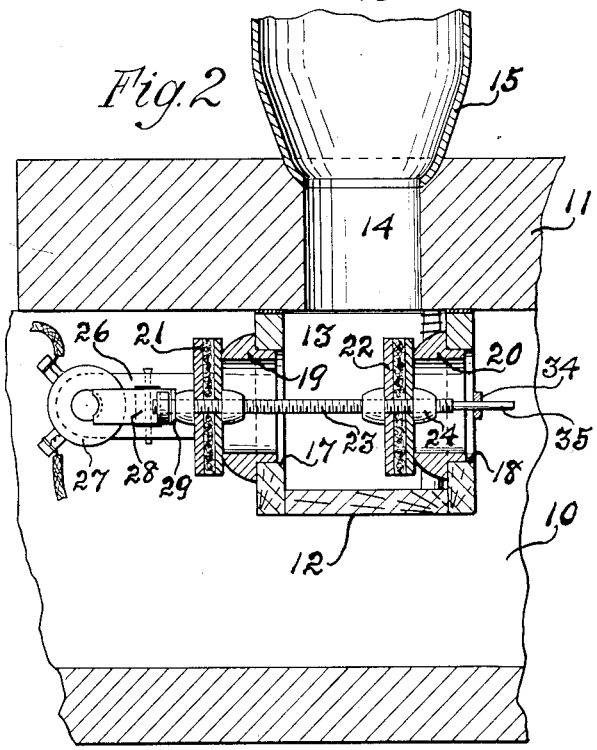
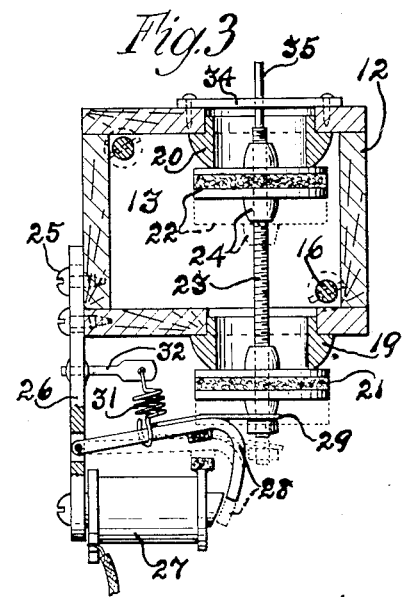
Inventor
John F. Wick
by J. Daniel Stuwe
Attorney.

Dec. 11, 1934. J. F. WICK 1,984,167
BALANCED VALVE FOR PIPE ORGANS
Filed Nov. 8, 1933 2 Sheets-Sheet 2

Inventor
John F. Wick
by J. Daniel Stuwe
Attorney.

Patented Dec. 11, 1934

1,984,167

UNITED STATES PATENT OFFICE 1,984,167

BALANCED VALVE FOR PIPE ORGANS

John F. Wick, Highland, Ill., assignor to Wicks Pipe Organ Co., Highland, Ill., a corporation of Illinois Application November 8, 1933, Serial No. 697,114

7 Claims. (Cl. 84—335)

This invention relates to a balanced valve for pipe organs, and more particularly to improved valve means for controlling the passage of air under pressure from the wind chest to the pipes of organs.

In the pipe organs now in use electro-pneumatic devices are largely employed for operating the valves of the organ pipes, each device involving the use of a pneumatic member in conjunction with an electro-magnet for opening the valve on the organ pipe, thus requiring a complicated and expensive construction.

Valve actuating mechanisms have also been perfected for opening the valve directly by the use of an electrically actuated member, as illustrated by the patent to Louis J. Wick, #1,736,684, for Valve operating mechanism for organs, issued November 19, 1929, and although these are highly efficient for operating the valves on the smaller organ pipes, they close too fast to permit the amount of air required to develop a full tone to enter large pipes on a staccato touch.

It is one of the main objects and purposes of this invention to provide an improved valve device, in the form of a balanced or compensating valve, which by its construction and arrangement will entirely eliminate the need of any pneumatic means for operating the valves of the large organ pipes.

Another undesirable feature met with on all present types of pipe organs is the popping, pounding, and slamming noises created by the sudden closing of the valves, which becomes especially aggravating upon operating the large pipe valves and creates considerable annoyance during the playing operation.

It is a further object of this invention to overcome any such objectionable noises, and to provide a balanced valve device comprising a valve chamber and balanced valve elements thereon which are arranged for controlling the air to the organ pipe so that the valve will close gently and noiselessly, no matter how large the pipe and how great the air pressure in the wind chest of the organ.

Another object of this invention is to provide a balanced valve device of this type which closes slowly or with a lag, thereby permitting a copious amount of air to pass through the valve, which is especially desirable on a short staccato touch. Such valve device is furthermore provided with an air chamber which is effective in storing a small amount of compressed air, in view whereof this valve device makes possible the production of a complete tone and a greatly improved speech of a pipe, which is particularly valuable in the bass sections of the organ and when playing in a rapid tempo or staccato style.

These and various other objects and advantages will become apparent from the following description, taken in connection with the accompanying drawings, wherein the invention is illustrated in several of its preferred forms of construction, it being understood that various other arrangements and forms of construction may be resorted to for carrying out the objects and purposes of this invention.

In the drawings:

Fig. 1 is a vertical sectional view taken through the wind chest of a pipe organ, showing a pair of my balanced valves in the preferred form of construction and being mounted in position in said wind chest for controlling the flow of air from the chest to a pair of pipes, the section being taken through one pipe and its attached valve and in front of the other pipe and its attached valve, each valve being arranged as a unit.

Fig. 2 is a vertical sectional view taken on line 2—2 of Fig. 1.

Fig. 3 is a horizontal sectional view taken on line 3—3 of Fig. 1.

Figure 4:
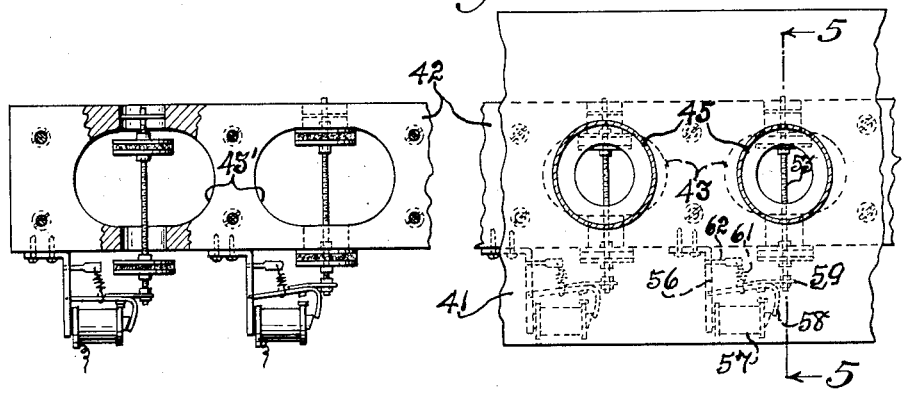
Fig. 4 is a plan view, parts being broken away and parts in section, showing a modified form of this invention, wherein the valve device is shown in its collective form enabling several valves to be mounted combined under the topboard.
Figure 5:
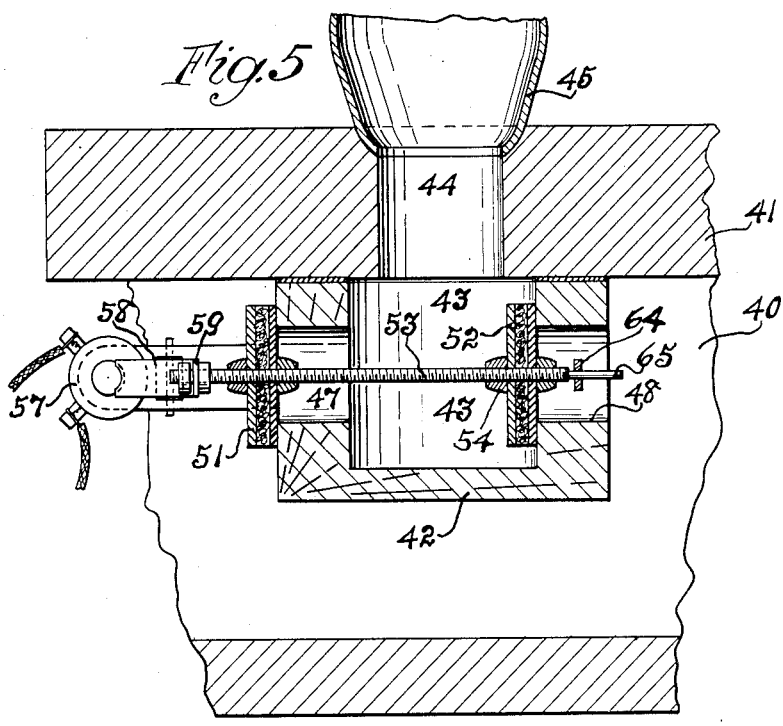
Fig. 5 is a vertical sectional view taken on line 5—5 of Fig. 4.

The present invention, whether constructed as a single valve device which may be mounted as a unit under the topboard of the pipe organ, as shown in Figs. 1 to 3; or whether constructed with a plurality of valve devices arranged collectively or in combination and thus mounted under the topboard, as shown in Figs. 4 and 5, in either of its forms comprises an air chamber or air holding means which is mounted to have open communication with the air passage to the organ pipe, and which is provided with companion valve ports thereon and companion valve elements connected to operate in unison for opening and closing said ports; and this valve chamber with its pair of companion elements is so arranged that one element moves with the current of air under pressure, while the other one moves against the current, in opening and in closing the valve, thereby constituting a perfectly balanced or compensated valve wherein the negative pressure against one movable valve element compensates for the positive pressure against the other element, both being under the influence of the air under pressure in the wind chest and in its travel into the valve chamber, in view of which only a very small amount of force is required for either moving the valve or for retaining it in position, and only a very small magnet, consuming a very small current, is needed to open this valve.

In Figs. 1, 2 and 3 of the drawings my invention is shown in its preferred form of construction, each valve device being arranged and mounted as a unit in the wind chest 10 underneath the topboard 11 of a pipe organ and comprising a box or casing 12 having an air chamber 13 therein which is in open communication at its upper end with the air passage 14 provided on topboard 11 and leading to the organ pipe 15 which is mounted on said topboard, as indicated in the drawings. The box is mounted on said topboard in any convenient manner, for example, by the use of screws 16, so that it can be readily removed therefrom for repairs and for replacement.

This balanced valve device comprises a pair of companion valve ports 17 and 18 which are shown located on opposite sides of the casing having valve seats 19 and 20 mounted therein, one seat facing toward the outside and the other toward the inside of said casing, thereby providing a pair of similar companion valve ports positioned on opposite sides of the casing and being axially aligned. A pair of similar companion valve elements 21 and 22 engage said seats 19 and 20, being connected by means of a stem 23 having suitable fastening means 24 thereon for securing the valve elements in their properly spaced positions on the stem whereby the elements move in unison for opening and closing the valve ports, said valve elements and valve seats being constructed in the usual approved manner.

The means employed herein for operating the valve preferably consists of an improved operating mechanism which is mountable as a unit on the casing, as by means of screws 25, and including a supporting bracket 26 having an electro-magnet 27 mounted thereon for actuating an armature 28 pivoted on bracket 26 and carrying a bar or plate 29 secured to the outer end of valve stem 23, as best shown in Fig. 2 of the drawings, whereby the valve is opened when the electro-magnet is energized by application of the electric current. A coiled spring 31 has one end attached to the armature and its other end to a post 32 which is secured on bracket 26, whereby the balanced valve is drawn to a closed position.

This improved and unitary valve opening and closing mechanism, including the bracket with the electro-magnet and its armature and the spring, are more fully disclosed and claimed in the above-mentioned Patent #1,736,684.

With the use of this balanced valve device, it is apparent from an inspection of the drawings that the air under pressure in wind chest 10 has a tendency to retain valve element 21 in its closed position seated firmly against valve seat 19, whereas said air at the same time has the tendency of pressing valve element 22 inwardly of casing 12 and away from valve seat 20, that is, to move said element to the open position; and as said valve seats and valve elements are of equal size, it is evident that the tendency of one element to be closed balances and equalizes the tendency of the other element to be open, thereby creating a balanced valve which requires but very little force to move in either direction, either into the open or into the closed position. Repeated experimentation with this balanced valve device in actual practice, especially while employed for operating the large valves on the bass section of the pipe organ, have shown that the compressed air has a tendency to travel more freely against the valve element 22 and straight through port 18 while open, into chamber 13, than to travel in a circuitous path around the open valve element 21, through valve port 17, into the chamber. It appears that this is due to the straight passage of the air through port 18 into chamber 13 and to air passage 14, while the air must pass substantially in an S-shaped path to and fro around valve element 21, into valve seat 19, to enter chamber 13. For that reason, a bridge or strip 34 is placed across valve port 20, which thus conveniently functions as a guide and support for the end 35 of stem 23, and at the same time acts as a compensating element to slightly reduce the effective cross-sectional area for the ingress of air through port 18 and seat 20 wherefrom the valve element 22 moves inwardly into the chamber during the opening of the valve.

It is apparent from the above disclosure that very little power is required for moving this balanced valve into either its open or its closed position, and that consequently, only a small magnet 27 is necessary, which consumes but a very small amount of current for opening the valve; and also that the spring 31 may be a very small one for effectively closing the valve. It is also apparent that this casing with its air chamber 13 acts as means for storing air, and that the same in conjunction with the balanced valve elements will cause a lag in closing the same, thereby permitting a copious amount of air to pass through the valve and air passage 14 to pipe 15, affording an improved speech of the pipe, which has proved to be especially desirable on a short staccato touch.

This valve device is constructed as a complete unit and is mountable as such on the topboard for controlling the passage of air from the wind chest to the air passage of the organ pipe. The casing may be conveniently mounted so that the valve stem or axis extends either longitudinally or transversely of said board, and also vertically thereof; however, it is preferred to mount the casing so that the valve stem and elements move horizontally, so that it is not necessary to overcome or consider the effect of gravity for operating the valve.

In Figs. 4 and 5 I have shown another manner in which this invention may be carried into effect, and therein several valves are combined or arranged collectively so that several of them can be mounted together under the topboard. In this form several of the valves are combined in an auxiliary board or member 42 which is mounted in the wind chest 40 under the topboard 41, said board containing a plurality of chambers 43, which are arranged to suit the adjacent air passages 44 leading to the organ pipes 45. A plurality of valves may thus be placed together in one auxiliary valve board 42 to control the passage of air to a plurality of pipes, as indicated by the smaller chambers and pipes shown at the right hand side of Fig. 4; while a plurality of larger valve chambers 43' may be likewise provided in such auxiliary board, having larger valves and stronger actuating means associated therewith, for use with the larger pipes, as indicated at the left hand side of Fig. 4; and the valve board may also be in parts, each part containing only several balanced valves to suit the associated pipes in a group or section.

In this form as in the preceding form the valve comprises valve ports 47 and 48 provided in the board on opposite sides of chamber 43 which are closed by means of valve elements 51 and 52 fastened on a stem 53 by the use of suitable securing means 54. The valve operating mechanism also includes a bracket 56 secured on the valve board and carrying an electro-magnet 57 and a cooperating armature 58 thereon, also a plate 59 extending from the armature to valve shaft 53 for opening the valves, and a spring 61 attached to a post 62 and to the armature for closing the valve; while a combination guide member and reducing strip 64 is mounted across valve port 48, for the double purpose of guiding the end 65 of valve stem 53 and to make the cross-sectional area of this port smaller than that of the opposite port 47, as explained in describing the preceding form. Each one of these collective valves embodies the several desirable valve features and operates and functions exactly the same as each one of the unitary valve devices disclosed in the preceding form.

I claim:

1. A balanced valve device for controlling the admission of air from the wind chest to the pipe of an organ provided with means for operating the same, said device comprising a chamber mounted in open communication with the air passage to said pipe, a pair of air ports of substantially equal size on said chamber, a stem and a pair of valve elements secured thereon for said ports, one element opening inwardly with the air pressure to the chamber and the other opening outwardly against the air pressure to the chamber, and a bridge member mounted across the port of said inwardly opening element serving to reduce the size of this port and to act as a guide for said stem.

2. A balanced valve device for controlling the admission of air to the pipe of an organ provided with means for operating the device, said device comprising a casing including a chamber adapted to be mounted in open communication with said pipe, companion air ports of substantially equal size on opposite sides of said chamber, a threaded stem having companion valve elements adjustably mounted aligned thereon to operate in unison for controlling said ports, one element being movable inwardly of the chamber and the other outwardly of the chamber in operating the valve, and a bridge member mounted across the port of said inwardly movable element serving to reduce the size of this port and to act as a guide for said stem, whereby the valve closes slowly and without any valve noises.

3. A valve device mountable as a unit on the topboard of a pipe organ for controlling the passage of air to a pipe of said organ and provided with means for operating the device, said device comprising a casing including a chamber adapted to be placed in communication with the air passage to said pipe and having companion valve ports on opposite sides of said chamber, said ports including a pair of openings having a pair of substantially equal-sized valve seats therein, companion valve elements of substantially equal size aligned and operating in unison to engage said seats and control said ports, one element moving inwardly of the chamber and the other outwardly thereof in operating the device, and a member mounted across the port of said inwardly movable element to reduce the size of this port and to guide said element.

4. A balanced valve device for controlling the admission of air from the wind chest to a pipe of an organ, said device comprising a chamber mounted in open communication with the air passage to said pipe, a pair of air ports of substantially equal size on said chamber, a stem and a pair of valve elements secured thereon for said ports, one element opening inwardly with the air pressure to the chamber and the other opening outwardly against the air pressure to the chamber, a member mounted across the port of said inwardly opening element serving to reduce the size of this port and to act as a guide for one end of the stem, and operating means connected to the other end of the stem to support said end and to operate the valve.

5. An auxiliary valve board for a pipe organ adapted to be mounted under the top board thereof, said board having a plurality of ports leading from the wind chest to a plurality of organ pipes and having valves for said ports, each valve including a chamber communicating with the air passage to a pipe and provided with companion valve ports, and companion valve elements for said ports connected to operate in unison, one movable inwardly and the other outwardly of the chamber during valve operation.

6. An auxiliary valve board for a pipe organ adapted to be mounted under the top board thereof, said board having a plurality of ports leading from the wind chest to a plurality of organ pipes and having valves for said ports, each valve including a chamber communicating with the air passage to a pipe and provided with companion valve ports, companion valve elements for said ports connected to operate in unison, one movable inwardly and the other outwardly of the chamber during valve operation, and individual electric means for operating the companion valve elements of each chamber.

7. An auxiliary valve board for a pipe organ adapted to be mounted under the top board thereof, said board having a plurality of ports leading from the wind chest to a plurality of organ pipes and having balanced valves for said ports, each valve including a chamber communicating with the air passage to a pipe and having a pair of substantially equal sized valve ports, a stem and a pair of companion valve elements thereon to operate in unison for controlling said pair of ports, one movable inwardly and the other outwardly of the chamber during valve operation, a bridge member on the port of said inwardly movable element to restrict its size and to serve as a guide for the stem, and individual means for operating the companion valve elements of each chamber.

JOHN F. WICK.